US012803468B2

United States Patent

(12) United States Patent
Kudo et al.

(10) Patent No.: US 12,803,468 B2
(45) Date of Patent: Nov. 17, 2026

(54) POWER INPUT CIRCUIT AND INVERTER-INTEGRATED VEHICULAR ELECTRIC COMPRESSOR EQUIPPED WITH SAME

(71) Applicant: SANDEN CORPORATION, Gunma (JP)

(72) Inventors: Keiya Kudo, Gunma (JP); Masatoshi Saito, Gunma (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 19/109,711

(22) PCT Filed: Aug. 29, 2023

(86) PCT No.: PCT/JP2023/031298

§ 371 (c)(1),
(2) Date: Mar. 7, 2025

(87) PCT Pub. No.: WO2024/062858

PCT Pub. Date: Mar. 28, 2024

(65) Prior Publication Data

US 2026/0081540 A1 Mar. 19, 2026

(30) Foreign Application Priority Data

Sep. 22, 2022 (JP) ................................ 2022-151399

(51) Int. Cl.
*H02M 1/32* (2007.01)
*H02M 1/44* (2007.01)
*H02M 7/539* (2006.01)

(52) U.S. Cl.
CPC ............ *H02M 7/539* (2013.01); *H02M 1/32* (2013.01); *H02M 1/44* (2013.01)

(58) Field of Classification Search
CPC .......... H02M 7/539; H02M 1/32; H02M 1/44; H02M 1/36
See application file for complete search history.

(56) References Cited

U.S. PATENT DOCUMENTS

| | | | | |
|---|---|---|---|---|
| 2008/0062587 | A1 | 3/2008 | Takaiwa et al. | |
| 2014/0168846 | A1* | 6/2014 | Maruyama | H02H 9/002 361/166 |
| 2021/0075312 | A1* | 3/2021 | Yoshida | H03K 17/0822 |

FOREIGN PATENT DOCUMENTS

| | | |
|---|---|---|
| JP | 2002-354794 A | 12/2002 |
| JP | 2008-072826 A | 3/2008 |

(Continued)

OTHER PUBLICATIONS

International Search Report dated Nov. 14, 2023 filed in PCT/JP2023/031298; 4 pages.

(Continued)

*Primary Examiner* — Rexford N Barnie
*Assistant Examiner* — Thai H Tran
(74) *Attorney, Agent, or Firm* — Rankin, Hill & Clark LLP

(57) ABSTRACT

Provided is a power input circuit capable of limiting excessive inrush current generated when a DC power source is turned on and a smoothing capacitor is charged. The power input circuit includes an EMC filter circuit 7 having a smoothing capacitor 12, a subsequent-stage power switching element Q2, a switch circuit 23 that turns on/off the power switching element Q2, a subsequent-stage inrush current limiting circuit 9 that limits inrush current by adjusting the voltage of a control electrode of the power switching element Q2, a preceding-stage power switching element Q4 that conducts/blocks a conduction path between the EMC filter circuit 7 and a battery 2, and a preceding-stage inrush current limiting circuit 10 that limits inrush current when the (Continued)

battery 2 is turned on by adjusting the voltage of the gate of the power switching element Q4.

6 Claims, 2 Drawing Sheets

(56) References Cited

FOREIGN PATENT DOCUMENTS

| | | | |
|---|---|---|---|
| JP | 2012-143114 | A | 7/2012 |
| JP | 2019-205286 | A | 11/2019 |

OTHER PUBLICATIONS

Office Action issued on Jun. 8, 2026 for the corresponding JP Patent Application No. 2022-151399.

* cited by examiner

POWER INPUT CIRCUIT AND INVERTER-INTEGRATED VEHICULAR ELECTRIC COMPRESSOR EQUIPPED WITH SAME

TECHNICAL FIELD

The present invention relates to a power input circuit from a DC power source to a load, and an inverter-integrated vehicular electric compressor including the power input circuit, which limits inrush current:

BACKGROUND ART

For example, in an inverter-integrated electric compressor mounted on a vehicle, when power supply from a battery (DC power source) serving as a low-voltage (LV) power source to a load such as a DC/DC converter is turned on/off, inrush current flows to charge an output capacitor. Thus, a power input circuit that adjusts the voltage of a control electrode of a power switching element to limit the inrush current and performs constant current operation has been designed (see, for example, Patent Literature 1 and Patent Literature 2).

CITATION LIST

Patent Literature

Patent Literature 1: JP-A-2019-205286
Patent Literature 2: JP-A-2012-143114

SUMMARY OF INVENTION

Problems to be Solved by Invention

According to the conventional power input circuit, it is possible to make the rise of the inrush current when the power switching element is turned on gentle, and to prevent the peak value of the current charging the output capacitor from exceeding a predetermined limit current value.

On the other hand, a filter circuit such as an EMC circuit for noise suppression is used for the power input circuit of this type, and a smoothing capacitor is provided for the filter circuit. When an ignition of a vehicle is turned on or an accessory is turned on and a DC power source (battery) is turned on for the power input circuit, charge of the smoothing capacitor is started, but there is a problem that excessive inrush current is generated at that time and the peak value exceeds the required limit current value.

The present invention has been made to solve these conventional technical problems, and an object of the present invention is to provide a power input circuit capable of limiting excessive inrush current generated when a DC power source is turned on and a smoothing capacitor is charged, and an inverter-integrated vehicular electric compressor including the power input circuit.

Solution to Problems

The power input circuit of the present invention is for controlling current from a DC power source to a load, which includes a filter circuit having a smoothing capacitor, a subsequent-stage power switching element that conducts/blocks a conduction path between the filter circuit and the load, a switch circuit that turns on/off the subsequent-stage power switching element, a subsequent-stage inrush current limiting circuit that limits inrush current by adjusting the voltage of a control electrode of the subsequent-stage power switching element, a preceding-stage power switching element that conducts/blocks a conduction path between the filter circuit and the DC power source, and a preceding-stage inrush current limiting circuit that limits inrush current when the DC power source is turned on by adjusting the voltage of a control electrode of the preceding-stage power switching element.

In the above-described invention, in the power input circuit according to one embodiment of the present application, each of the inrush current limiting circuits includes a current detection resistor that detects current with voltage generated at both ends by inrush current, and a current limiting control element having a control electrode and a pair of main electrodes, one of the main electrodes being connected to the control electrode of the power switching element, each of the current limiting control elements changes the voltage of the control electrode of the current limiting control element according to voltage induced at both ends of the current detection resistor, and adjusts the voltage of the control electrode of each of the power switching elements to perform constant current operation, and a resistance element is connected between one end of each of the current detection resistors and the control electrode of each of the current limiting control elements, and a capacitance element is connected between the control electrode and one of the main electrodes of each of the current limiting control elements.

In the above-described invention, in the power input circuit according one embodiment of the present application, a first resistor is connected between the control electrode of the preceding-stage power switching element and the DC power source on the side not connected to the preceding-stage power switching element, the switch circuit is connected between the control electrode of the subsequent-stage power switching element and the DC power source on the side not connected to the subsequent-stage power switching element via another first resistor, and a second resistor is connected between one of main electrodes and the control electrode of each of the power switching elements.

In the above-described invention, in the power input circuit according to one embodiment of the present application, immediately after the DC power source has been turned on, the voltage of the control electrode of the preceding-stage power switching element does not reach the ON voltage of the preceding-stage power switching element, and the voltage of the control electrode of the current limiting control element of the preceding-stage inrush current limiting circuit reaches the ON voltage of the current limiting control element, and immediately after the switch circuit has been brought into conduction, the voltage of the control electrode of the subsequent-stage power switching element does not reach the ON voltage of the subsequent-stage power switching element, and the voltage of the control electrode of the current limiting control element of the subsequent-stage inrush current limiting circuit reaches the ON voltage of the current limiting control element.

In one embodiment of the present application, in the power input circuit according to one embodiment of the present application, each of the power switching elements is a voltage-driven switching element having a gate as the control electrode, each of the current limiting control elements is a bipolar transistor having a base as the control electrode and a collector and an emitter as the main electrodes, and the collector as one of the main electrodes of each of the current limiting control elements is connected to the control electrode of each of the power switching elements, and each of the capacitance elements is connected between the base and the collector of each of the current limiting control elements.

In one embodiment of the present application, power input circuit according to one embodiment of the present application, another filter circuit is connected between the DC power source and the preceding-stage inrush current limiting circuit, and each of the filter circuits has an inductance component.

An inverter-integrated vehicular electric compressor according to one embodiment of the present application includes the power input circuit of each of the above-described inventions and a control circuit that controls an inverter as a load.

Effects of Invention

According to the present invention, the power input circuit that controls the current from the DC power source to the load includes the filter circuit having the smoothing capacitor, the subsequent-stage power switching element that conducts/blocks the conduction path between the filter circuit and the load, the switch circuit that turns on/off the subsequent-stage power switching element, and the subsequent-stage inrush current limiting circuit that limits the inrush current by adjusting the voltage of the control electrode of the subsequent-stage power switching element. Thus, the subsequent-stage inrush current limiting circuit suppresses the rise of the inrush current when the switch circuit is brought into conduction.

In addition, since the power input circuit includes the preceding-stage power switching element that conducts/blocks the conduction path between the filter circuit and the DC power source, and the preceding-stage inrush current limiting circuit that limits the inrush current when the DC power source is turned on by adjusting the voltage of the control electrode of the preceding-stage power switching element, the preceding-stage inrush current limiting circuit also suppresses the rise of the inrush current when the DC power source is turned on.

As a result, it is possible to limit excessive inrush current generated when the DC power source is turned on and the smoothing capacitor is charged, and to effectively eliminate the disadvantage that the peak value exceeds the required limit current value.

In particular, as in one embodiment of the present application, each of the inrush current limiting circuits includes the current detection resistor that detects the current with the voltage generated at both ends by inrush current, and the current limiting control element having the control electrode and the pair of main electrodes, one of the main electrodes connected to the control electrode of the power switching element, each of the current limiting control elements changes the voltage of the control electrode of the current limiting control element according to the voltage induced at both ends of the current detection resistor, and adjusts the voltage of the control electrode of each of the power switching elements to perform the constant current operation, and the resistance element is connected between one end of each of the current detection resistors and the control electrode of each of the current limiting control elements, and the capacitance element is connected between the control electrode and one of the main electrodes of each of the current limiting control elements. Thus, even in a case where the filter circuit having the inductance component is provided as in one embodiment of the present application, current vibration phenomenon can be suppressed, and the peak value can be effectively limited.

For example, as in one embodiment of the present application, the first resistor is connected between the control electrode of the preceding-stage power switching element and the DC power source on the side not connected to the preceding-stage power switching element, the switch circuit is connected between the control electrode of the subsequent-stage power switching element and the DC power source on the side not connected to the subsequent-stage power switching element via another first resistor, and the second resistor is connected between one of the main electrodes and the control electrode of each of the power switching elements.

As in one embodiment of the present application, immediately after the DC power source has been turned on, the voltage of the control electrode of the preceding-stage power switching element does not reach the ON voltage of the preceding-stage power switching element, and the voltage of the control electrode of the current limiting control element of the preceding-stage inrush current limiting circuit reaches the ON voltage of the current limiting control element, and immediately after the switch circuit has been brought into conduction, the voltage of the control electrode of the subsequent-stage power switching element does not reach the ON voltage of the subsequent-stage power switching element, and the voltage of the control electrode of the current limiting control element of the subsequent-stage inrush current limiting circuit reaches the ON voltage of the current limiting control element. Thus, the rise of each inrush current when the DC power source is turned on and when the switch circuit is brought into conduction can be effectively suppressed.

Specifically, as in one embodiment of the present application, each of the power switching elements is the voltage-driven switching element having the gate as the control electrode, each of the current limiting control elements is the bipolar transistor having the base as the control electrode and the collector and the emitter as the main electrodes, and the collector as one of the main electrodes of each of the current limiting control elements is connected to the control electrode of each of the power switching elements, and each of the capacitance elements is connected between the base and collector of each of the current limiting control elements.

Further, as in one embodiment of the present application, by connecting another filter circuit between the DC power source and the preceding-stage inrush current limiting circuit, each element of the preceding-stage inrush current limiting circuit can be protected.

In particular, even if each of the capacitance elements connected between the control electrode and one of the main electrodes of each of the current limiting control elements has a small value, the peak value of each inrush current can be effectively limited to a predetermined current value. As a result, it is possible to stop the power supply to the load without causing an excessive delay with respect to a power OFF signal, which is extremely suitable in the inverter-integrated vehicular electric compressor as in oneembodiment of the present application. .

DESCRIPTION OF EMBODIMENTS

Hereinafter, embodiments of the present invention will be described in detail with reference to the drawings.

(1) Power Input Circuit 1

Figure 1:
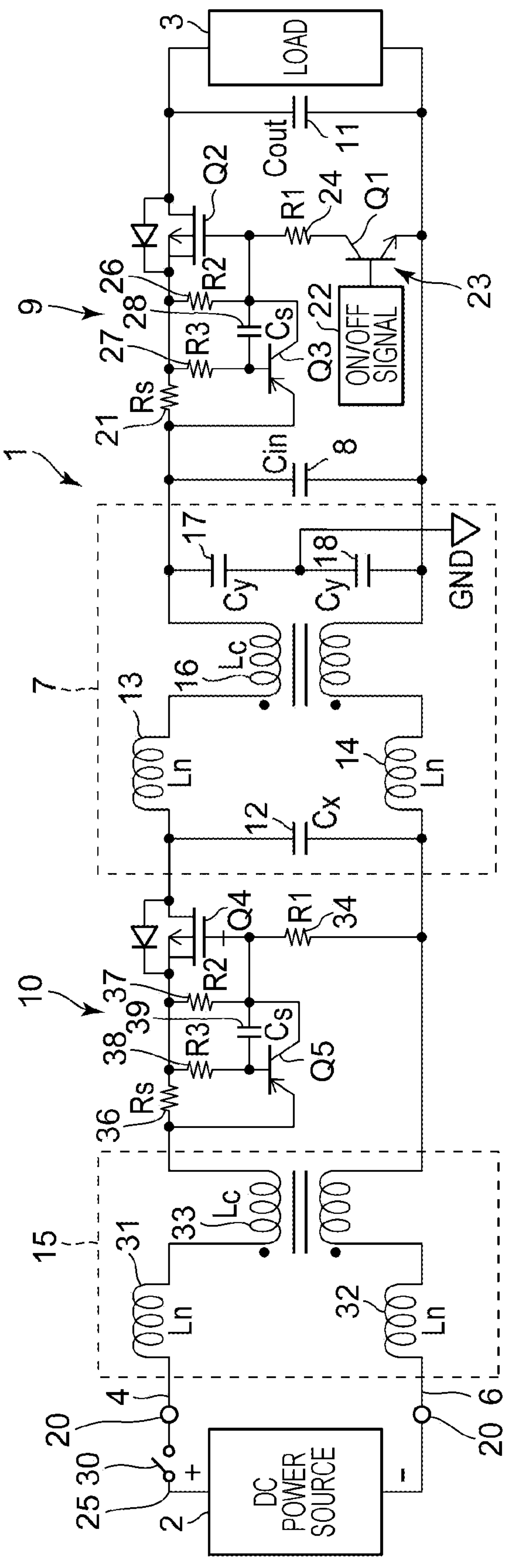
FIG. 1 is an electric circuit diagram of a power input circuit according to an embodiment to which the present invention is applied.

FIG. 1 shows an electric circuit diagram of a power input circuit 1 according to an embodiment to which the present invention is applied. In this figure, the power input circuit 1 of the embodiment supplies DC voltage from a battery (e.g., low-voltage (LV) power source of a DC of 12V, DC power source in the present invention) 2 mounted on a vehicle to a DC/DC converter 3 (load in the present invention) forming a control circuit of an inverter-integrated vehicular electric compressor (not shown) of an air conditioner also mounted on the vehicle, and controls current from the battery 2 to the DC/DC converter 3.

The power input circuit 1 of the embodiment includes an EMC filter circuit 7 (an example of a filter circuit in the present invention) connected to a positive power supply line 4(+) and a negative power supply line 6(−) forming a conduction path in the present invention, an input capacitor 8 denoted by Cin in the figure, a subsequent-stage inrush current limiting circuit 9 connected on a subsequent stage side to the EMC filter circuit 7 and the input capacitor 8, a subsequent-stage power switching element Q2 connected on the subsequent stage side to the subsequent-stage inrush current limiting circuit 9, a switch circuit 23, an output capacitor HI denoted by Cout in the figure and connected between the subsequent-stage power switching element Q2 and the load 3, a preceding-stage power switching element Q4 connected on a preceding stage side to the EMC filter circuit 7, a preceding-stage inrush current limiting circuit 10 connected on the preceding stage side to the preceding-stage power switching element Q4, and an EMC filter circuit 15 (an example of another filter circuit in the present invention) connected between the preceding-stage inrush current limiting circuit 10 and the DC power source 2.

Note that in the case of the embodiment, the positive power supply line 4 and the negative power supply line 6 are connected to the positive side (+) and negative side (−) of the battery 2, respectively, via a cable 25 including a connector 20. Further, reference numeral 30 in FIG. 1 denotes a switch. The switch 30 is a switch brought into conduction when an ignition (IG) of the vehicle is turned on or when an accessory (ACC) is turned on. In FIG. 1, the switch 30 is provided for the cable 25, but the position of the switch 30 is not limited to this example. For example, when the ignition (IG) of the vehicle is turned on and the switch 30 is brought into conduction, the voltage of the battery 2 (DC power source) is applied to the power input circuit 1.

(2) EMC Filter Circuit 7

The EMC filter circuit 7 includes a smoothing capacitor 12 denoted by Cx in the figure and connected between the positive power supply line 4 and the negative power supply line 6, normal mode coils 13, 14 (inductance components in the present invention) denoted by Ln in the figure and connected in series to the positive power supply line 4 and the negative power supply line 6, respectively, on the subsequent stage side of the smoothing capacitor 12, a common mode coil 16 (inductance component in the present invention) denoted by Le in the figure and connected to the subsequent stage side of the normal mode coils 13, 14, and Y capacitors 17, 18 denoted by Cy in the figure and connected between the positive power supply line 4 and the negative power supply line 6 and the ground (GND), respectively, on the subsequent stage side of the common mode coil 16.

The smoothing capacitor 12 is a capacitor for reducing differential mode noise, and the Y capacitors 17, 18 are capacitors for reducing common mode noise.

The input capacitor 8 is connected between the positive power supply line 4 and the negative power supply line 6 on the subsequent stage side of the EMC filter circuit 7, the subsequent-stage inrush current limiting circuit 9 is connected to the positive power supply line 4 on the subsequent stage side of the input capacitor 8, the subsequent-stage power switching element Q2 and the switch circuit 23 are connected between the positive power supply line 4 and the negative power supply line 6 on the subsequent stage side of the inrush current limiting circuit 9, and the output capacitor 11 is connected between the positive power supply line 4 and the negative power supply line 6 on the subsequent stage side of the subsequent-stage power switching element Q2 and the switch circuit 23. The load 3 is connected between the positive power supply line 4 and the negative power supply line 6 on the subsequent stage side of the output capacitor 11.

(3) Subsequent-Stage Power Switching Element Q2

The subsequent-stage power switching element Q2 is a switching element that conducts/blocks the positive power supply line 4 (conduction path) between the EMC filter circuit 7 and the output capacitor 11 and the load 3, and is a P-type MOS-FET as a voltage-driven switching element in the embodiment.

(4) Switch Circuit 23

The switch circuit 23 is for turning on/off the subsequent-stage power switching element Q2 described above, and includes an NPN transistor (bipolar transistor) Q1 and an ON/OFF signal circuit 22 in the embodiment. One end of a first resistor 24 denoted by R1 in the figure is connected to a gate as a control electrode of the subsequent-stage power switching element Q2, and a collector as one main electrode of the transistor Q1 of the switch circuit 23 is connected to the other end of the first resistor 24.

An emitter as the other main electrode of the transistor Q1 is connected to the negative power supply line 6, so that the switch circuit 23 is connected between the gate of the power switching element Q2 and the negative power supply line 6 (battery 2 on the side not connected to the power switching element Q2) via the first resistor 24. The output of the ON/OFF signal circuit 22 is connected to a base as a control electrode of the transistor Q1.

(5) Subsequent-Stage Inrush Current Limiting Circuit 9

The subsequent-stage inrush current limiting circuit 9 includes a current detection resistor 21 denoted by Rs in the figure, a PNP transistor (bipolar transistor) Q3 as a current limiting control element in the present invention, a second resistor 26 denoted by R2 in the figure, a third resistor (resistance element in the present invention) 27 denoted by R3 in the figure, and a capacitor (capacitance element in the present invention) 28 denoted by Cs in the figure.

In this case, the current detection resistor 21 is connected in series with the positive power supply line 4 on the subsequent stage side of the input capacitor 8, a source as one main electrode of the subsequent-stage power switching element Q2 is connected to the end of the current detection resistor 21 on the output capacitor 11 side, and a drain as the other main electrode of the power switching element Q2 is connected to the end of the output capacitor 11 on the positive power supply line 4 side.

In addition, a collector as one main electrode of the transistor Q3 is connected to the gate of the subsequent-stage power switching element Q2, and an emitter as the other main electrode of the transistor Q3 is connected to the positive power supply line 4 at the end of the current detection resistor 21 on the input capacitor 8 side. The second resistor 26 is connected between the source and gate of the subsequent-stage power switching element Q2, and the third resistor 27 is connected between the positive power supply line 4 at the end of the current detection resistor 21 on the power switching element Q2 side and a base as a control electrode of the transistor Q3. The capacitor 28 is connected between the base and collector of the transistor Q3.

The subsequent-stage inrush current limiting circuit 9 limits inrush current (charge current of the output capacitor 11) to the output capacitor 11 as described later by adjusting the voltage of the gate (control electrode) of the subsequent-stage power switching element Q2.

(6) EMC Filter Circuit 15

The EMC filter circuit 15 includes normal mode coils 31, 32 (inductance components in the present invention) denoted by Ln in the figure and connected in series with the positive power supply line 4 and the negative power supply line 6, respectively, and a common mode coil 33 (inductance component in the present invention) denoted by Lc in the figure and connected to the subsequent stage side of the normal mode coils 31, 32. The EMC filter circuit 15 is provided to protect the preceding-stage inrush current limiting circuit 10.

The preceding-stage inrush current limiting circuit 10 is connected to the positive power supply line 4 on the subsequent stage side of the EMC filter circuit 15, the preceding-stage power switching element Q4 is connected to the positive power supply line 4 on the subsequent stage side of the preceding-stage inrush current limiting circuit 10, and the smoothing capacitor 12 of the EMC filter circuit 7 is connected between the positive power supply line 4 and the negative power supply line 6 on the subsequent stage side of the preceding-stage power switching element Q4.

(7) Preceding-Stage Power Switching Element Q4

The preceding-stage power switching element Q4 is a switching element that conducts/blocks the positive power supply line 4 (conduction path) between the EMC filter circuit 15 and the smoothing capacitor 12 (EMC filter circuit 7), and is a P-type MOS-FET as a voltage-driven switching element in the embodiment. One end of a first resistor 34 denoted by R1 in the figure is connected to a gate as a control electrode of the preceding-stage power switching element Q4, and the other end of the first resistor 34 is connected to the negative power supply line 6.

(8) Preceding-Stage Inrush Current Limiting Circuit 10

The preceding-stage inrush current limiting circuit 10 includes a current detection resistor 36 denoted by Rs in the figure, a PNP transistor (bipolar transistor) Q5 as a current limiting control element in the present invention, a second resistor 37 denoted by R2 in the figure, a third resistor (resistance element in the present invention) 38 denoted by R3 in the figure, and a capacitor (capacitance element in the present invention) 39 denoted by Cs in the figure.

In this case, the current detection resistor 36 is connected in series with the positive power supply line 4 on the subsequent stage side of the common mode coil 33, a source as one main electrode of the preceding-stage power switching element Q4 is connected to the end of the current detection resistor 36 on the smoothing capacitor 12 side, and a drain as the other main electrode of the power switching element Q4 is connected to the end of the smoothing capacitor 12 on the positive power supply line 4 side.

In addition, a collector as one main electrode of the transistor Q5 is connected to the gate of the preceding-stage power switching element Q4, and an emitter as the other main electrode of the transistor Q5 is connected to the positive power supply line 4 at the end of the current detection resistor 36 on the common mode coil 33 side. The second resistor 37 is connected between the source and gate of the preceding-stage power switching element Q4, and the third resistor 38 is connected between the positive power supply line 4 at the end of the current detection resistor 36 on the power switching element Q4 side and a base as a control electrode of the transistor Q5. The capacitor 39 is connected between the base and collector of the transistor Q5.

The preceding-stage inrush current limiting circuit 10 limits inrush current (charge current of the smoothing capacitor 12) to the smoothing capacitor 12 as described later by adjusting the voltage of the gate (control electrode) of the preceding-stage power switching element Q4.

(9) Operation of Power Input Circuit 1

Figure 2:
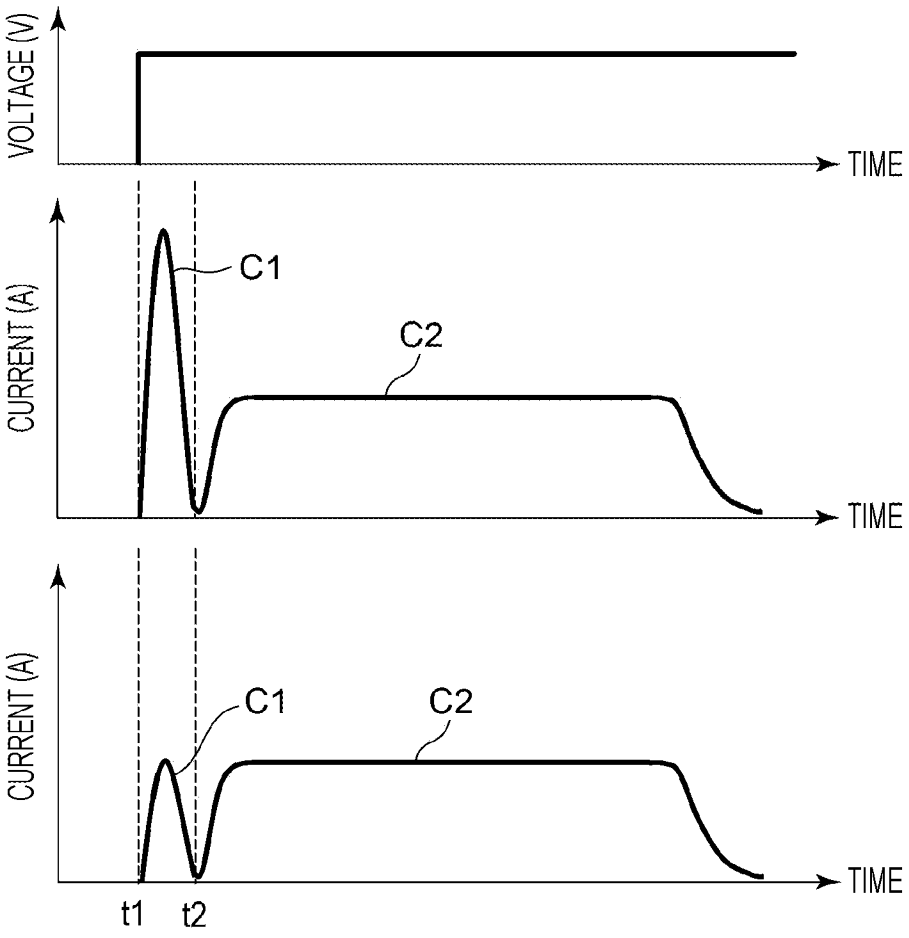
FIG. 2 is a diagram for explaining comparison of turning on of a DC power source for a power input circuit, the charge current of a smoothing capacitor, an ON/OFF signal, and the charge current of an output capacitor between a case of providing a preceding-stage inrush current limiting circuit and a case of not providing the preceding-stage inrush current limiting circuit.

Next, operation of the power input circuit 1 of the embodiment will be described with reference to FIG. 2. First, operation when the battery (DC power source) 2 is turned on will be described. Note that the uppermost graph in FIG. 2 shows the voltage between the positive power supply line 4 and negative power supply line 6 of the power input circuit 1, the middle graph shows the charge current C1 of the smoothing capacitor 12 and the charge current C2 of the output capacitor 11 when the preceding-stage power switching element Q4 and the preceding-stage inrush current limiting circuit 10 are not connected, and the lowermost graph shows the charge current C1 of the smoothing capacitor 12 and the charge current C2 of the output capacitor 11 in the case of the power input circuit 1 of FIG. 1 in which the preceding-stage power switching element Q4 and the preceding-stage inrush current limiting circuit 10 are provided.

(9-1) Operation when Battery (DC Power Source) 2 is Turned On

For example, when the ignition (IG) of the vehicle is turned on and the switch 30 in FIG. 1 is brought into conduction, the battery (DC power source) 2 is turned on (connected) for the power input circuit 1. When the switch 30 is brought into conduction at time t1 in FIG. 2, current from the battery 2 flows to the current detection resistor 36, the second resistor 37, and the first resistor 34 via the EMC filter circuit 15.

Meanwhile, in the capacitor 39 connected between the collector and base of the transistor Q5, electric charge is not stored in an initial state at the moment when the switch 30 is brought into conduction, and therefore, the third resistor 38 and the second resistor 37 are in a state close to that in which these resistors are connected in parallel. Thus, voltage corresponding to the current detection resistor 36—the series connection of the third resistor 38 and the second resistor 37 in parallel, which is obtained by dividing the DC voltage of the battery 2 by the circuit in series with the first resistor 34 is applied to the base of the transistor Q5, and since this voltage does not exceed a base forward voltage (ON voltage), voltage exceeding the base forward voltage of the transistor Q5 is not applied also between the gate and source of the preceding-stage power switching element Q4 connected in parallel with the second resistor 37.

Here, the resistance values of the current detection resistor 36, the second resistor 37, the third resistor 38, and the first resistor 34 are selected such that the voltage applied to the base of the transistor Q5 by the resistance voltage division is equal to or higher than the base forward voltage (ON voltage) within the range of the DC voltage to be used. As the preceding-stage power switching element Q4, one in which a threshold voltage Vth1 between the gate and source of the power switching element Q4 is higher than the base forward voltage (ON voltage) of the transistor Q5 is selected.

Since the gate-source voltage of the power switching element Q4 does not exceed the threshold voltage Vth1 (the potential of the gate with respect to the source does not decrease by the threshold Vth1 or more), the power switching element Q4 remains off, no current flows between the source and drain of the power switching element Q4, and no charge current flows in the smoothing capacitor 12.

On the other hand, after the switch 30 has been brought into conduction, charge of the capacitor 39 starts via the third resistor 38 and the base of the transistor Q5. As a result, the charge voltage between the terminals of the capacitor 39 gradually increases, and the voltage applied to the second resistor 37 gradually approaches the value in a case where the capacitor 39 is absent.

Here, since the resistance values of the second resistor 37 and the first resistor 34 are selected such that the voltage applied between the gate and source of the power switching element Q4 is equal to or higher than the threshold voltage Vth1 within the range of the DC voltage to be used, the gate-source voltage of the power switching element Q4 eventually exceeds the threshold voltage Vth1 (the voltage of the gate with respect to the source of the power switching element Q4 decreases by the threshold Vth1 or more), the power switching element Q4 is turned on, and the charge current C1 starts to gradually flow from the battery 2 to the smoothing capacitor 12 via the source and drain of the preceding-stage power switching element Q4.

Further, since the charge current starts to flow between the source and drain of the power switching element Q4, the voltage between both ends of the current detection resistor 36 also increases, but as the voltage between both ends of the current detection resistor 36 approaches the same voltage as the base forward voltage (ON voltage) of the transistor Q5, the current (charge current for the capacitor 39) flowing through the second resistor 37 decreases (because only the amount obtained by subtracting the voltage between both ends of the current detection resistor 36 from the base forward voltage of the transistor Q5 flows to the second resistor 37), so that the charge of the capacitor 39 is suppressed, and the increase in the gate-source voltage of the preceding-stage power switching element Q4 becomes more gradual.

That is, by inserting the capacitor 39 between the base and collector of the transistor Q5, immediately after the switch 30 has been brought into conduction, the gate-source voltage of the preceding-stage power switching element Q4 gradually increases while the transistor Q5 remains on, and thereafter, the operation shifts to smooth current limiting operation according to the increase in the voltage between both ends of the current detection resistor 36 due to the increase in the charge current (inrush current) to the smoothing capacitor 12 as described later.

When the capacitor 39 is connected between the collector and base of the transistor Q5 as shown in FIG. 1, as described above, the charge voltage between the terminals of the capacitor 39 gradually increases, so that the gate-source voltage of the preceding-stage power switching element Q4 does not change rapidly, and the rise of the charge current C1 to the smoothing capacitor 12 is also suppressed (FIG. 2).

Since the voltage of the gate (control electrode) of the preceding-stage power switching element Q4 is adjusted by the preceding-stage inrush current limiting circuit 10 in this manner, the rise of the inrush current (charge current C1 to the smoothing capacitor 12) is suppressed. Thus, even if the normal mode coils 31, 32 are provided in the EMC filter circuit 15, vibration phenomenon of the charge current C1 is suppressed, and the peak value of the input current exceeding a predetermined limit current value is eliminated.

Here, in a case where an air conditioner switch (AC) to be described later is turned off, a signal output from the ON/OFF signal circuit 22 is OFF, and the subsequent-stage power switching element Q2 is also OFF, so that no charge current C1 flows at the time when the charge of the smoothing capacitor 12 is completed (FIG. 2).

Note that it is also possible to suppress the vibration phenomenon of the charge current due to the inrush current by inserting a capacitor between the gate and source of the power switching element Q4 (in parallel with the second resistor 37), but in order to obtain the same effect, a capacitor capacity several tens of times as great as that in a case where the capacitor 39 is inserted between the base and collector of the transistor Q5 is required.

This is because in a case where the capacitor is inserted between the gate and source of the preceding-stage power switching element Q4, the voltage between the gate and source of the power switching element Q4 gradually increases as the capacitor is charged with the time constant between the inserted capacitor and the first resistor 34, but the inrush current limiting operation is started only when the voltage between both ends of the current detection resistor 36 reaches the base forward voltage of the transistor Q5, and the drain current flows at once when the gate-source voltage of the power switching element Q4 exceeds the threshold Vth1, so that in order to effectively suppress the vibration phenomenon of the charge current, it is necessary to sufficiently increase the time constant with the first resistor 34, that is, to sufficiently increase the capacity of the capacitor to be inserted.

Then, even after the ignition (IG) has been turned off and the switch 30 has been blocked, the electric charge is discharged via the second resistor 37 due to the capacity of the capacitor inserted between the gate and source of the power switching element Q4, and the output voltage is held for unnecessarily long time until the voltage falls below the threshold voltage Vth1 between the gate and source of the power switching element Q4 and the power switching element Q4 is turned off. However, by using the capacitor 39 between the base and collector of the transistor Q5, the discharge time is shortened due to the small capacity of the capacitor 39, and the problem above is also solved.

When the charge current flows between the source and drain of the preceding-stage power switching element Q4, the voltage between both ends of the current detection resistor 36 increases, so that the base bias voltage of the transistor Q5 increases and the transistor Q5 is turned on. When the transistor Q5 is turned on, current flows between the emitter and collector of the transistor Q5. Since this current flows through the first resistor 34, the voltage of the gate of the power switching element Q4 increases, thereby limiting the charge current C1 to the smoothing capacitor 12, which flows from the source to the drain. That is, constant current operation is performed, in which the current flowing through the current detection resistor 36 does not exceed a predetermined value, and the drain current of the preceding-stage power switching element Q4 is limited.

Here, as shown in FIG. 1, in a case where the preceding-stage power switching element Q4, the preceding-stage inrush current limiting circuit 10, and the EMC filter circuit 15 are not connected, immediately after the ignition (IG) has been turned on and the switch 30 has been brought into conduction, the charge current flows as the inrush current from the battery 2 to the smoothing capacitor 12, the rise of the current also becomes rapid, and the peak value of the charge current exceeds the predetermined limit current value (shown in the middle graph of FIG. 2). However, according to the circuit of FIG. 1, such a problem can be solved (shown in the lowermost graph of FIG. 2).

(9-2) Operation of Switch Circuit 23 During Conduction

Next, operation after the battery 2 has been turned on and the smoothing capacitor 12 has been charged as described above will be described. When the air conditioner switch (AC) of the vehicle is turned on at time (2 in FIG. 2 and an electric compressor is started, the signal output from the ON/OFF signal circuit 22 is switched from OFF to ON.

When the signal output from the ON/OFF signal circuit 22 is turned on, the transistor Q1 (NPN bipolar transistor) is turned on by the ON signal output, and the switch circuit 23 is brought into conduction. When the transistor Q1 is turned on, the collector of the transistor Q1 is connected to the gate of the subsequent-stage power switching element Q2 via the first resistor 24. Thus, after the transistor Q1 has been turned on, the current from the battery 2 flows to the current detection resistor 21, the second resistor 26, the first resistor 24, and the collector of the transistor Q1 via the EMC filter circuit 7.

Meanwhile, in the capacitor 28 connected between the collector and base of the transistor Q3, electric charge is not stored in an initial state at the moment when the transistor Q1 is turned on, and therefore, the third resistor 27 and the second resistor 26 are in a state close to that in which these resistors are connected in parallel. Thus, voltage corresponding to the current detection resistor 21—the series connection of the third resistor 27 and the second resistor 26 in parallel, which is obtained by dividing the DC voltage of the battery 2 by the circuit in series with the first resistor 24 is applied to the base of the transistor Q3, and since this voltage does not exceed a base forward voltage (ON voltage), voltage exceeding the base forward voltage of the transistor Q3 is not applied also between the gate and source of the subsequent-stage power switching element Q2 connected in parallel with the second resistor 26.

Here, the resistance values of the current detection resistor 21, the second resistor 26, the third resistor 27, and the first resistor 24 are selected such that the voltage applied to the base of the transistor Q3 by the resistance voltage division is equal to or higher than the base forward voltage (ON voltage) within the range of the DC voltage to be used. As the subsequent-stage power switching element Q2, one in which a threshold voltage Vth2 between the gate and source of the power switching element Q2 is higher than the base forward voltage (ON voltage) of the transistor Q3 is selected.

Since the gate-source voltage of the subsequent-stage power switching element Q2 does not exceed the threshold voltage Vth2 (the potential of the gate with respect to the source does not decrease by the threshold Vth2 or more), the subsequent-stage power switching element Q2 remains off, no current flows between the source and drain of the power switching element Q2, and no charge current flows in the output capacitor 11.

On the other hand, after the transistor Q1 has been turned on, charge of the capacitor 28 starts via the third resistor 27 and the base of the transistor Q3. As a result, the charge voltage between the terminals of the capacitor 28 gradually increases, and the voltage applied to the second resistor 26 gradually approaches the value in a case where the capacitor 28 is absent. Here, since the resistance values of the second resistor 26 and the first resistor 24 are selected such that the voltage applied between the gate and source of the subsequent-stage power switching element Q2 is equal to or higher than the threshold voltage Vth2 within the range of the DC voltage to be used, the gate-source voltage of the subsequent-stage power switching element Q2 eventually exceeds the threshold voltage Vth2 (the voltage of the gate with respect to the source of the power switching element Q2 decreases by the threshold Vth2 or more), the subsequent-stage power switching element Q2 is turned on, and the charge current C2 starts to gradually flow from the battery 2 to the output capacitor 11 via the source and drain of the power switching element Q2.

Further, since the charge current C2 starts to flow between the source and drain of the subsequent-stage power switching element Q2, the voltage between both ends of the current detection resistor 21 also increases, but as the voltage between both ends of the current detection resistor 21 approaches the same voltage as the base forward voltage (ON voltage) of the transistor Q3, the current (charge current for the capacitor 28) flowing through the second resistor 26 decreases (because only the amount obtained by subtracting the voltage between both ends of the current detection resistor 21 from the base forward voltage of the transistor Q3 flows to the second resistor 26), so that the charge of the capacitor 28 is suppressed, and the increase in the gate-source voltage of the subsequent-stage power switching element Q2 becomes more gradual.

That is, by inserting the capacitor 28 between the base and collector of the transistor Q3, immediately after the transistor Q1 has been turned on, the gate-source voltage of the subsequent-stage power switching element Q2 gradually increases while the transistor Q3 remains on, and thereafter, the operation shifts to smooth current limiting operation according to the increase in the voltage between both ends of the current detection resistor 21 due to the increase in the charge current C2 (inrush current) to the output capacitor 11 as described later.

When the capacitor 28 is connected between the collector and base of the transistor Q3 as shown in FIG. 1, as described above, the charge voltage between the terminals of the capacitor 28 gradually increases, so that the gate-source voltage of the subsequent-stage power switching element Q2 does not change rapidly, and the rise of the charge current C2 to the output capacitor 11 is also suppressed (FIG. 2).

Since the voltage of the gate (control electrode) of the subsequent-stage power switching element Q2 is adjusted by the subsequent-stage inrush current limiting circuit 9 in this manner, the rise of the inrush current (charge current C2 to the output capacitor 11) is suppressed. Thus, even if the normal mode coils 13, 14 are provided in the EMC filter circuit 7, vibration phenomenon of the charge current C2 is suppressed, and the peak value of the input current exceeding a predetermined limit current value is eliminated.

Note that it is also possible to suppress the vibration phenomenon of the input current due to the inrush current by inserting a capacitor between the gate and source of the subsequent-stage power switching element Q2 (in parallel with the second resistor 26), but in order to obtain the same effect, a capacitor capacity several tens of times as great as that in a case where the capacitor 28 is inserted between the base and collector of the transistor Q3 is required.

This is because in a case where the capacitor is inserted between the gate and source of the subsequent-stage power switching element Q2, the voltage between the gate and source of the power switching element Q2 gradually increases as the capacitor is charged with the time constant between the inserted capacitor and the first resistor 24, but the inrush current limiting operation is started only when the voltage between both ends of the current detection resistor 21 reaches the base forward voltage of the transistor Q3, and the drain current flows at once when the gate-source voltage of the power switching element Q2 exceeds the threshold Vth2, so that in order to effectively suppress the vibration phenomenon of the input current, it is necessary to sufficiently increase the time constant with the first resistor 24, that is, to sufficiently increase the capacity of the capacitor to be inserted.

Then, even after the OFF signal has been output from the ON/OFF signal circuit 22, the electric charge is discharged via the second resistor 26 due to the capacity of the capacitor inserted between the gate and source of the subsequent-stage power switching element Q2, and the output voltage is held for unnecessarily long time until the voltage falls below the threshold voltage Vth2 between the gate and source of the subsequent-stage power switching element Q2 and the power switching element Q2 is turned off. However, by using the capacitor 28 between the base and collector of the transistor Q3, the discharge time is shortened due to the small capacity of the capacitor 28, and the problem above is also solved, When the charge current C2 flows between the source and drain of the subsequent-stage power switching element Q2, the voltage between both ends of the current detection resistor 21 increases, so that the base bias voltage of the transistor Q3 increases and the transistor Q3 is turned on. When the transistor Q3 is turned on, current flows between the emitter and collector of the transistor Q3. Since this current flows to the collector of the transistor Q1 through the first resistor 24, the voltage of the gate of the subsequent-stage power switching element Q2 increases, thereby limiting the charge current to the output capacitor 11, which flows from the source to the drain. That is, constant current operation is performed, in which the current flowing through the current detection resistor 21 does not exceed a predetermined value, and the drain current of the power switching element Q2 is limited.

Here, in a case where the capacitor 28 is not connected between the collector and base of the transistor Q3, the signal output from the ON/OFF signal circuit 22 is changed from OFF to ON at the time t2, and immediately after the transistor Q1 has been turned on, the voltage between both ends of the second resistor 26 exceeds the threshold voltage Vth2 of the gate-source voltage of the subsequent-stage power switching element Q2, so that the power switching element Q2 is turned on, the charge current flows as the inrush current from the battery 2 to the output capacitor 11 through the source and drain of the power switching element Q2, and the rise of the current also becomes rapid.

When the rapidly rising inrush current flows, in a case where the normal mode coils 13, 14 denoted by Ln in the figure, such as the EMC filter circuit 7, are provided at an input, resonance with the input capacitor 8 causes the input current to have a vibration waveform, and the peak value of the input current exceeds the predetermined limit current value (the same also applies to a case where a parasitic inductance is provided on an input current path from the DC power source). However, according to the circuit of FIG. 1, such a problem can be solved.

As described above in detail, according to the present invention, the power input circuit 1 that controls the current from the battery (DC power source) 2 to the load 3 includes the EMC filter circuit 7 having the smoothing capacitor 12, the subsequent-stage power switching element Q2 that conducts/blocks the conduction path between the EMC filter circuit 7 and the load 3, the switch circuit 23 that turns on/off the subsequent-stage power switching element Q2, and the subsequent-stage inrush current limiting circuit 9 that limits the inrush current by adjusting the voltage of the gate (control electrode) of the subsequent-stage power switching element Q2. Thus, the subsequent-stage inrush current limiting circuit 9 suppresses the rise of the inrush current when the switch circuit 23 is brought into conduction.

In addition, since the power input circuit 1 includes the preceding-stage power switching element Q4 that conducts/blocks the conduction path between the EMC filter circuit 7 and the battery 2, and the preceding-stage inrush current limiting circuit 10 that limits the inrush current when the battery 2 is turned on by adjusting the voltage of the gate (control electrode) of the preceding-stage power switching element Q4, the preceding-stage inrush current limiting circuit 10 also suppresses the rise of the inrush current when the battery 2 is turned on.

As a result, it is possible to limit excessive inrush current generated when the battery 2 is turned on and the smoothing capacitor 12 is charged, and to effectively eliminate the disadvantage that the peak value exceeds the required limit current value.

In particular, in the embodiment, each of the inrush current limiting circuits 9, 10 includes the current detection resistor 21, 36 that detects the current with the voltage generated at both ends by the inrush current and the transistor Q3, Q5 of which the collector is connected to the gate of the power switching element Q2, Q4. Each of the transistors Q3, Q5 changes the voltage of the base of the transistor Q3, Q5 according to the voltage induced at both ends of the current detection resistor 21, 36, and adjusts the voltage of the gate of the power switching element Q2, Q4 to perform the constant current operation. The third resistor 27, 38 is connected between one end of the current detection resistor 21, 36 and the base of the transistor Q3, Q5, and the capacitor 28, 39 is connected between the base and collector of the transistor Q3, Q5. Even in a case where the EMC filter circuit 7, 15 having the inductance component is provided, it is possible to effectively limit the peak value by suppressing the current vibration phenomenon.

Further, in the embodiment, the first resistor 34 is connected between the gate of the preceding-stage power switching element Q4 and the battery 2 on the side not connected to the power switching element Q4. The switch circuit 23 is connected between the gate of the subsequent-stage power switching element Q2 and the battery 2 on the side not connected to the power switching element Q2 via another first resistor 24. The second resistor 37, 26 is connected between the source and gate of the power switching element Q4, Q2, Immediately after the battery 2 has been turned on, the voltage of the gate of the preceding-stage power switching element Q4 does not reach the ON voltage of the power switching element Q4, and the voltage of the base of the transistor Q5 of the preceding-stage inrush current limiting circuit 10 reaches the ON voltage of the transistor Q5. Immediately after the switch circuit 23 has been brought into conduction, the voltage of the gate of the subsequent-stage power switching element Q2 does not reach the ON voltage of the subsequent-stage power switching element Q2, and the voltage of the base of the transistor Q3 of the subsequent-stage inrush current limiting circuit 9 reaches the ON voltage of the transistor Q3. Thus, it is possible to effectively suppress the rise of each inrush current when the battery 2 is turned on and when the switch circuit 23 is brought into conduction.

Further, by connecting the EMC filter circuit 15 between the battery 2 and the preceding-stage inrush current limiting circuit 10 as in the embodiment, each element of the preceding-stage inrush current limiting circuit 10 can be protected.

In particular, according to the circuit configuration of the embodiment, even if the capacitor 28, 39 connected between the base and collector of the transistor Q3, Q5 has a small capacity, the peak value of each inrush current can be effectively limited to the predetermined current value. As a result, it is possible to stop the power supply to the load 3 without causing an excessive delay with respect to the power OFF signal, which is extremely suitable in the inverter-integrated vehicular electric compressor as in the embodiment.

Note that in the embodiment, the DC/DC converter (load) forming the control circuit of the inverter-integrated vehicular electric compressor has been described as an example. However, the invention other than one embodiment of the present application is not limited thereto, and the present invention is effective for controlling the current from the DC power source to the load in general.

Further, in the embodiment, the P-type MOS-FET is adopted as the power switching element Q2, Q4, but the polarities of the power switching element Q2, Q4 and the transistor Q1 (NPN type), Q3, Q5 (PNP type) are not limited to those of the embodiment, and it is also possible to achieve the power switching element Q2, Q4 and the transistor Q1, Q3, Q5 by using elements having opposite polarities with the negative power supply line 6 as a connection point

LIST OF REFERENCE SIGNS

1 Power Input Circuit
2 Battery (DC Power Source)
3 DC/DC Converter (Load)
4 Positive Power Supply Line
6 Negative Power Supply Line
7 EMC Filter Circuit (Filter Circuit)
9 Subsequent-Stage Inrush Current Limiting Circuit
10 Preceding-Stage Inrush Current Limiting Circuit
11 Output Capacitor
15 EMC Filter Circuit (Another Filter Circuit)
21, 36 Current Detection Resistor
23 Switch Circuit
24, 34 First Resistor
26, 37 Second Resistor
27, 38 Third Resistor (Resistance Element)
28, 39 Capacitor (Capacitance Element)
Q1 Transistor
Q2 Subsequent-Stage Power Switching Element
Q3, Q5 Transistor (Current Limiting Control Element)
Q4 Preceding-Stage Power Switching Element

The invention claimed is:

1. A power input circuit for controlling current from a DC power source to a load, comprising:

a filter circuit having a smoothing capacitor;

a subsequent-stage power switching element that conducts/blocks a conduction path between the filter circuit and the load;

a switch circuit that turns on/off the subsequent-stage power switching element;

a subsequent-stage inrush current limiting circuit that limits inrush current by adjusting voltage of a control electrode of the subsequent-stage power switching element;

a preceding-stage power switching element that conducts/blocks a conduction path between the filter circuit and the DC power source; and a preceding-stage inrush current limiting circuit that limits inrush current when the DC power source is turned on by adjusting voltage of a control electrode of the preceding-stage power switching element, wherein each of the preceding-stage and subsequent-stage inrush current limiting circuits includes a current detection resistor that detects current with voltage generated at both ends by inrush current, and a current limiting control element having a control electrode and a pair of main electrodes, one of the main electrodes being connected to the control electrode of the power switching element, each of the current limiting control elements changes voltage of the control electrode of the current limiting control element according to voltage induced at both ends of the current detection resistor, and adjusts the voltage of the control electrode of each of the power switching elements to perform constant current operation, and a resistance element is connected between one end of each of the current detection resistors and the control electrode of each of the current limiting control elements, and a capacitance element is connected between the control electrode and one of the main electrodes of each of the current limiting control elements.

2. The power input circuit according to claim 1, wherein a first resistor is connected between the control electrode of the preceding-stage power switching element and the DC power source on a side not connected to the preceding-stage power switching element, the switch circuit is connected between the control electrode of the subsequent-stage power switching element and the DC power source on a side not connected to the subsequent-stage power switching element via another first resistor, and a second resistor is connected between one of the main electrodes and the control electrode of each of the power switching elements.

3. The power input circuit according to claim 2, wherein immediately after the DC power source has been turned on, the voltage of the control electrode of the preceding-stage power switching element does not reach ON voltage of the preceding-stage power switching element, and the voltage of the control electrode of the current limiting control element of the preceding-stage inrush current limiting circuit reaches ON voltage of the current limiting control element, and immediately after the switch circuit has been brought into conduction, the voltage of the control electrode of the subsequent-stage power switching element does not reach ON voltage of the subsequent-stage power switching element, and the voltage of the control electrode of the current limiting control element of the subsequent-stage inrush current limiting circuit reaches ON voltage of the current limiting control element.

4. The power input circuit according to claim 1, wherein each of the power switching elements is a voltage-driven switching element having a gate as the control electrode, each of the current limiting control elements is a bipolar transistor having a base as the control electrode and a collector and an emitter as the main electrodes, and the collector as one of the main electrodes of each of the current limiting control elements is connected to the control electrode of each of the power switching elements, and each of the capacitance elements is connected between the base and the collector of each of the current limiting control elements.

5. The power input circuit according to claim 1, wherein another filter circuit is connected between the DC power source and the preceding-stage inrush current limiting circuit, and each of the filter circuits has an inductance component.

6. An inverter-integrated vehicular electric compressor comprising: the power input circuit according to claim 1; and a control circuit that controls an inverter as a load.

* * * * *